(12) United States Patent
Berhorst et al.

(10) Patent No.: US 12,476,522 B2
(45) Date of Patent: Nov. 18, 2025

(54) SENSOR WITH A SHEET METAL ELEMENT AND A CARRIER TO WHICH THE SHEET METAL ELEMENT IS FASTENED

(71) Applicant: Hella GmbH & Co. KGaA, Lippstadt (DE)

(72) Inventors: Jann Berhorst, Borchen (DE); Sascha Kuhlmann, Geseke (DE)

(73) Assignee: Hella GmbH & Co. KGaA, Lippstadt (DE)

(*) Notice: Subject to any disclaimer, the term of this patent is extended or adjusted under 35 U.S.C. 154(b) by 239 days.

(21) Appl. No.: 18/325,677

(22) Filed: May 30, 2023

(65) Prior Publication Data
US 2023/0318407 A1    Oct. 5, 2023

Related U.S. Application Data

(63) Continuation of application No. PCT/EP2021/079481, filed on Oct. 25, 2021.

(30) Foreign Application Priority Data

Nov. 30, 2020   (DE) .......................... 102020131680.1

(51) Int. Cl.
*H02K 11/215* (2016.01)
*H02K 15/02* (2025.01)

(52) U.S. Cl.
CPC ........... *H02K 11/215* (2016.01); *H02K 15/02* (2013.01)

(58) Field of Classification Search
CPC ...... H02K 11/00; H02K 11/215; H02K 23/66; H02K 15/02
USPC ....................................................... 310/68 B
See application file for complete search history.

(56) References Cited

FOREIGN PATENT DOCUMENTS

| DE | 10236700 | A1 | 2/2004 |
|----|----------|----|--------|
| DE | 202006007778 | U1 | 10/2007 |
| DE | 102007036959 | A1 | 2/2009 |
| DE | 102007045179 | A1 | 4/2009 |
| DE | 102008044840 | A1 | 3/2010 |
| DE | 102013010925 | A1 | 1/2015 |
| JP | 2017173089 | A  * | 9/2017 |

* cited by examiner

*Primary Examiner* — Jose A Gonzalez Quinones
(74) *Attorney, Agent, or Firm* — Husch Blackwell LLP (57) ABSTRACT

A sensor is provided with a sheet metal element and a carrier. The sheet metal element is arranged on a first side of the carrier, the sheet metal element extends within a ring that lies between an inner circle and an outer circle. The sheet metal element includes cutting structures that are cut into retaining elements of the carrier for fastening the sheet metal element to the carrier.

13 Claims, 7 Drawing Sheets

SENSOR WITH A SHEET METAL ELEMENT AND A CARRIER TO WHICH THE SHEET METAL ELEMENT IS FASTENED

CROSS REFERENCE

This application claims priority to PCT Application No. PCT/EP2021/079481, filed Oct. 25, 2021, which itself claims priority to German Application No. 10 2020 131680.1, filed Nov. 30, 2020, the entireties of both of which are hereby incorporated by reference.

FIELD OF THE INVENTION

The invention relates to a sensor with a sheet metal element and a carrier, where the sheet metal element is arranged on a first side of the carrier. The invention relates furthermore to a method and a tool for fastening the sheet metal element of a sensor to a carrier of this sensor.

BACKGROUND OF THE INVENTION

In particular with inductive sensors for detecting rotary movements and/or rotation angles, sheet metal elements are provided for that are fastened securely to a carrier, for example, to an axle. The document DE 20 2006 007 778 U1 discloses, for example, stamped sheet metal elements that are welded, soldered or adhered to a carrier.

The method for fastening the sheet metal elements is elaborate.

BRIEF SUMMARY OF THE INVENTION

The task underlying the invention was to propose a sensor in which the sheet metal element is fastened on the carrier in a simpler manner.

In accordance with the invention, this task is solved by the sheet metal element featuring cutting structures that are cut into the retaining elements of the carrier for fastening the sheet metal element to the carrier.

By cutting the cutting structures of the sheet metal element into the retaining elements, fastening of the sheet metal element to the carrier is achieved by means of a form fit and frictional connection. Cutting can be achieved by a movement of the sheet metal element relative to the carrier. No welding device, soldering device or adhesive is then needed any longer for the purpose of fastening.

In principle, there are several ways of designing the sheet metal element and the carrier to connect it by means of a relative movement. The sheet metal element and the carrier could be designed in such a way that they are connected to each other by means of a linear movement or a rotation by the cutting elements of the sheet metal element embedding themselves into the carrier. For a linear movement, the cutting elements can have straight or essentially straight cutting edges. If fastening is achieved through rotation, it is advantageous for the cutting elements to have curved cutting edges.

The sheet metal element can extend within a ring that is located between an inner circle and an outer circle. The cutting structures of the sheet metal element can be at least in part inner cutting structures that extend along the inner circle and/or are at least in part outer cutting structures that extend along the outer circle.

The retaining elements of the carrier can protrude on its first side, and feature at least one at least in part protruding inner retaining element that is arranged essentially within an inner circle and extends slightly outwards over the inner circle, and/or feature at least in part protruding outer retaining elements that are arranged essentially outside the outer circle and extend lightly inwards over the outer circle.

The inner cutting structures can be cut into the inner retaining element. In addition or as an alternative, the outer cutting structures can be cut into the outer retaining elements. A particularly secure connection is achieved if not only inner cutting structures and retaining elements but also outer cutting structures and retaining elements are provided for.

Preferentially, at least three inner cutting structures and a retaining element and/or at least three outer cutting structures and retaining elements are provided for.

In order to simplify joining the carrier and the sheet metal element, it is advantageous if the inner retaining elements along the inner circle are at a distance to each other that is the same size or larger is than the area over which the inner cutting structures extend along the inner circle, and/or if the outer retaining elements along the outer circle are at a distance to each other that is the same size or larger than the area over which the outer cutting structures extend along the outer circle.

An inventive sensor can be an inductive senor for detecting rotary movements or rotation angles. Then the sheet metal element can be part of a rotor. The sheet metal element can form a conductor loop, the rotation of which in an electromagnetic field causes this field to change. The electromagnetic field is generated by a stator. The change in the field caused by a movement of the sheet metal element can be detected by a conductor loop in the stator.

The ends of the cutting structures that are cut into the retaining elements can form cutting edges. This provides a particular simplification of the cutting in procedure.

With the sheet metal element of an inventive sensor, recesses can be provided for between the inner circle and the outer circle. These recesses can result from the course of the closed conductor loop formed by the sheet metal element. The recesses can be used to position a tool on the sheet metal element with which the force can be introduced into the sheet metal element that is necessary to effect a movement of the sheet metal element relative to the carrier by means of which the cutting structures are cut into the retaining elements.

To fasten a sheet metal element of an inventive sensor to a carrier of this sensor, the sheet metal element and the carrier are first arranged to each other in a first position in which the retaining elements are between the cutting structures. Then a rotary movement can be performed by means of which the carrier and the sheet metal element are moved, specifically rotated, against each other, causing the cutting structures to cut into retaining elements located in the direction of movement.

A tool for mounting the sheet metal element of a sensor to the carrier of this sensor can feature a first surface, over which carrier elements protrude that engage in the recesses of the sheet metal element when fastening the sheet metal element to the carrier. When moving the tool, the force can be introduced into the sheet metal element through the carrier elements engaging in the recesses.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The rotor 1, 2 of an inventive sensor shown in the Figures is composed of a sheet metal element 2 and a carrier 1.

Figure 2:
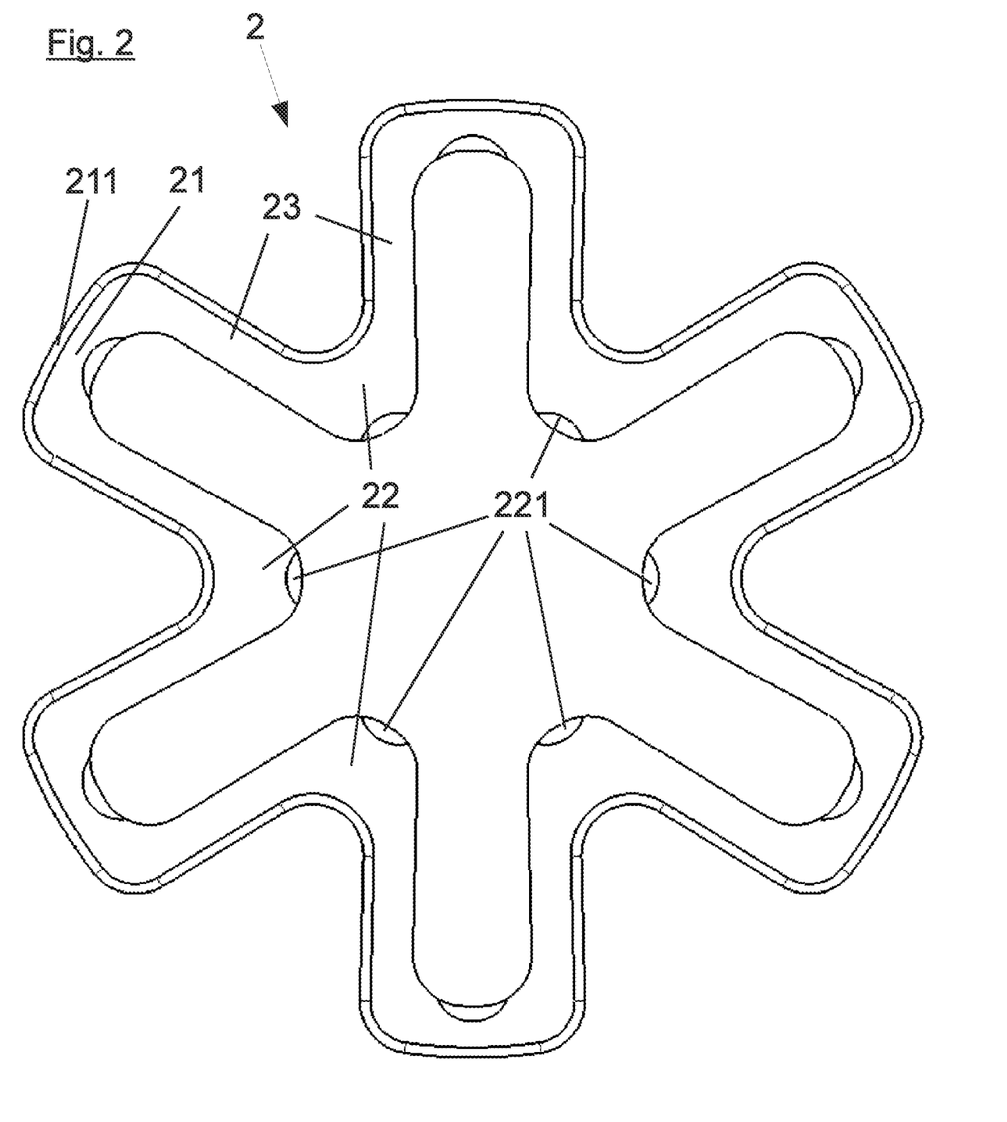
FIG. 2 is a front view of the sheet metal element.

The sheet metal element 2 forms a conductor loop. This conductor loop takes a meandering course between the inner circle and an outer circle around the central axis of the rotor 1, 2. Such conductor loops are known from inductive sensors. The meandering course of the conductor loop means that the conductor loop has six inner section 22 that lie more or less on an inner circle, and six outer sections 21 that lie more or less on an outer circle. The inner sections 22 have cutting structures 221 pointing inwards and the outer sections 21 have cutting structures 211 pointing outwards. The inner sections 22 and the outer structures 21 are connected by further sections 23 running from the inside to the outside. The outer cutting structures 211 protrude up to the outer circle and the inner cutting structures 221 protrude up to the inner circle.

Figure 3:
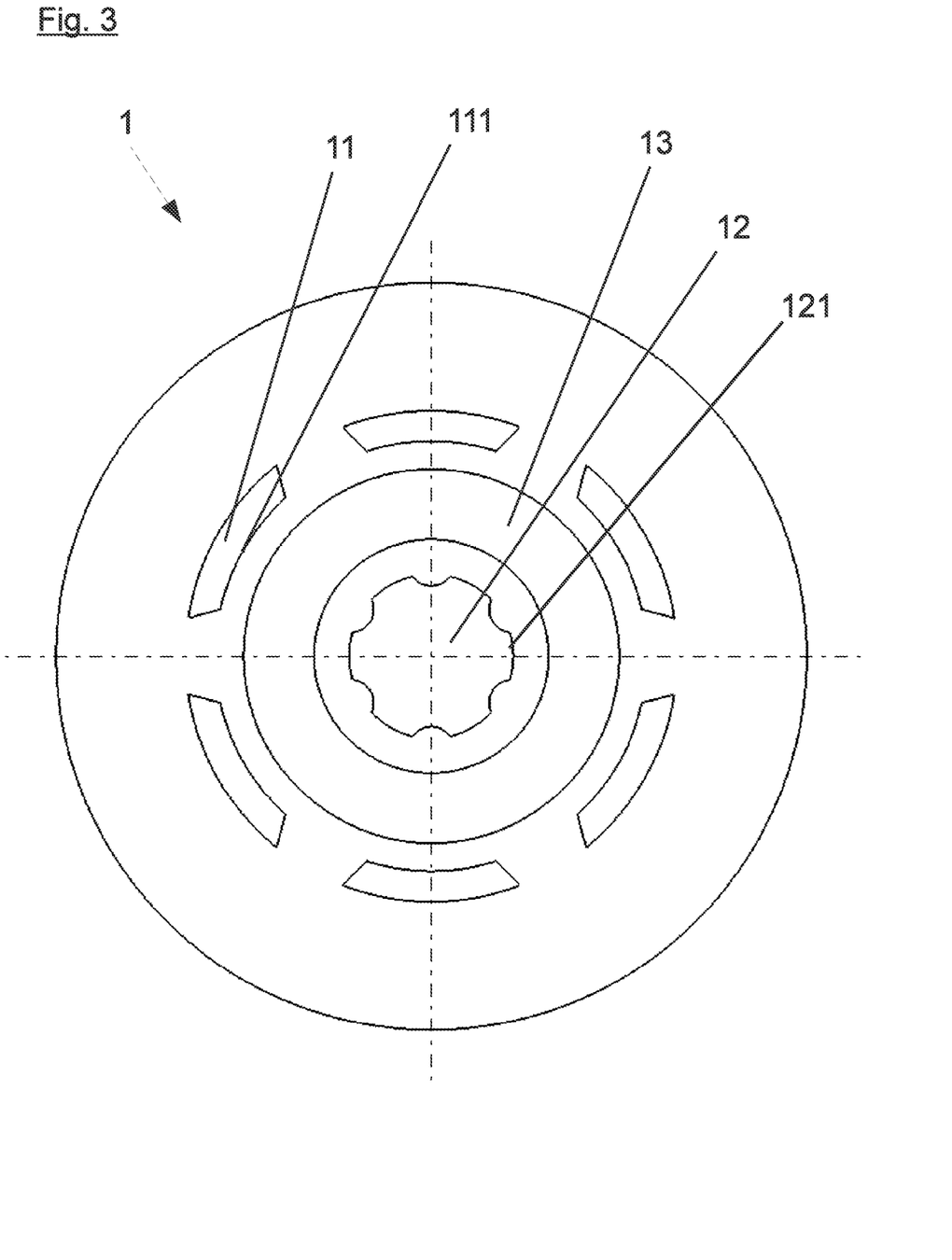
FIG. 3 is a front view of the carrier.

The carrier 1 is essentially cylindrical in form. On a first side, a front side of the carrier, retaining elements 11, 121 are provided for, namely an inner retaining element 12 and an outer retaining element 11. The retaining elements 11, 12 protrude beyond the first side of the carrier 1.

The outer retaining elements 11 are formed by arched fins that are located essentially on an outer side of an outer circle around the central axis of the carrier 2 or, as the case may be, the rotor 1, 2 and extend along the circle. An inner edge 111 of the fins or outer retaining elements 11 extends inwards across the outer circle.

The inner retaining element 12 is formed by a star-shaped elevation that protrudes in the center of the outer and inner circle across the first side of the carrier. This star-shaped elevation features prongs 121 that extend outwards across an inner circle around the central axis of the carrier 2 or, as the case may be, rotor 1, 2.

Between the inner and the outer circle, a ring-shaped groove 13 is provided for that is introduced into the first side.

Figure 5:
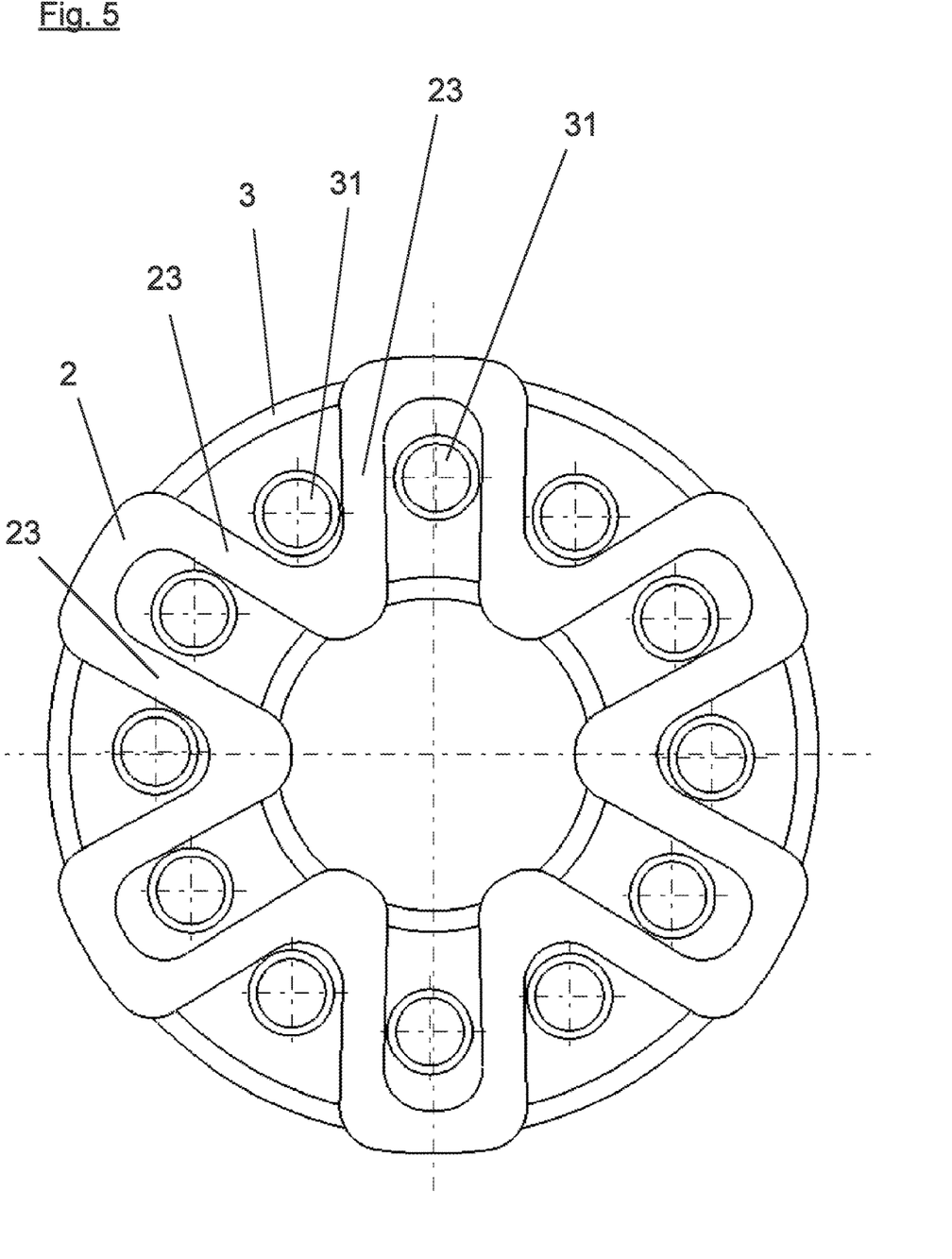
FIG. 5 is a front view of a tool and the sheet metal element inserted into the same.
Figure 6:
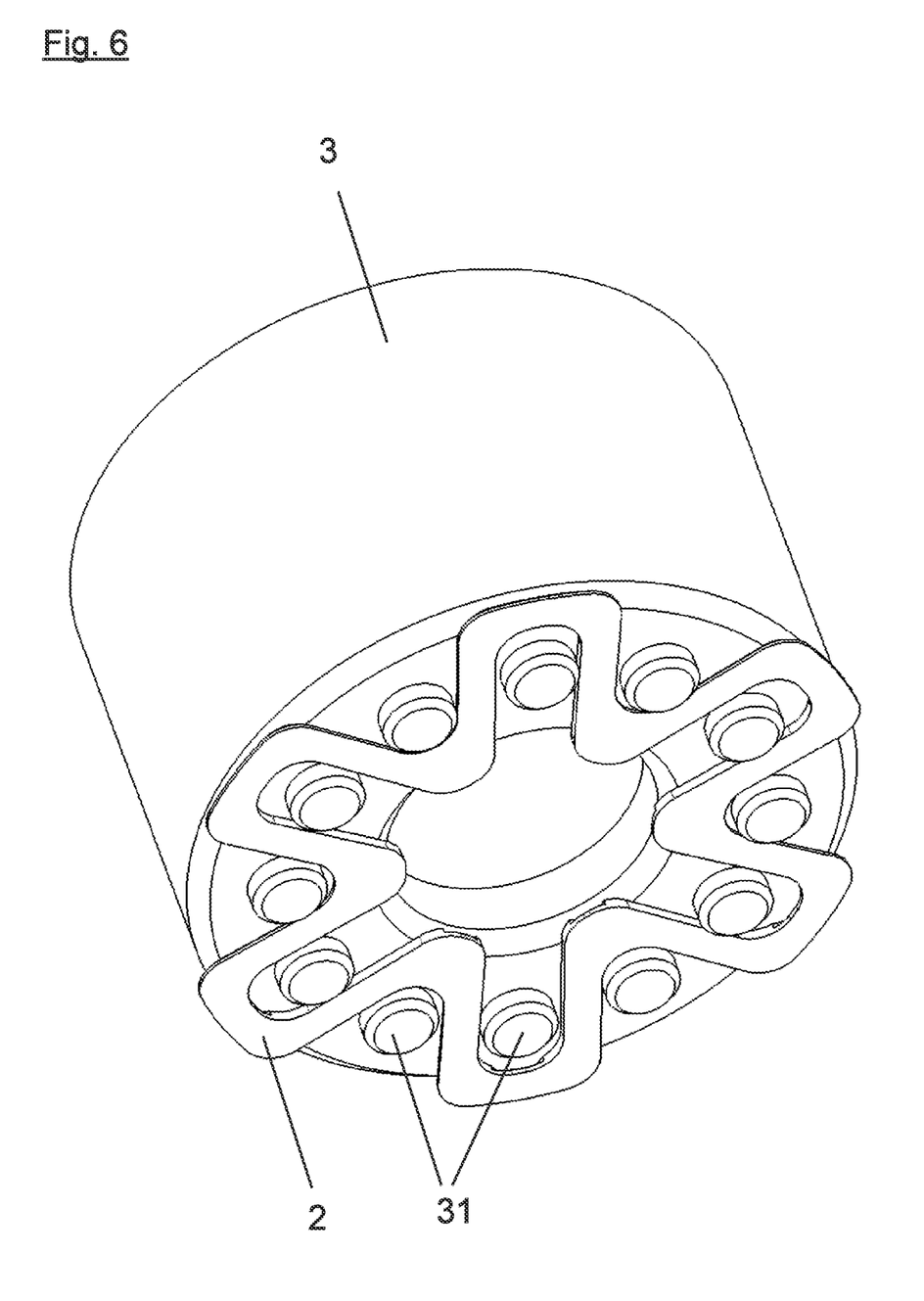
FIG. 6 is a perspective representation of the tool and the sheet metal element inserted into the same.

The tool 3 for fastening the sheet metal element 2 to the carrier 1 is likewise essentially cylindrical. On a first side, it has carrier elements 31. These are formed by cylindrical elevations that protrude across the first side. The carrier elements 31 lie between an inner and an outer circle around a central axis of the tool. In the center of the first side, an indentation that is circular in its cross-section is provided for.

To fasten the sheet metal element 2 to the carrier 1, the sheet metal element 2 is inserted into the tool 3. In this context, the connecting sections 23 of the conductor loop running from the inside to the outside run between the carrier elements 31.

Figure 1:
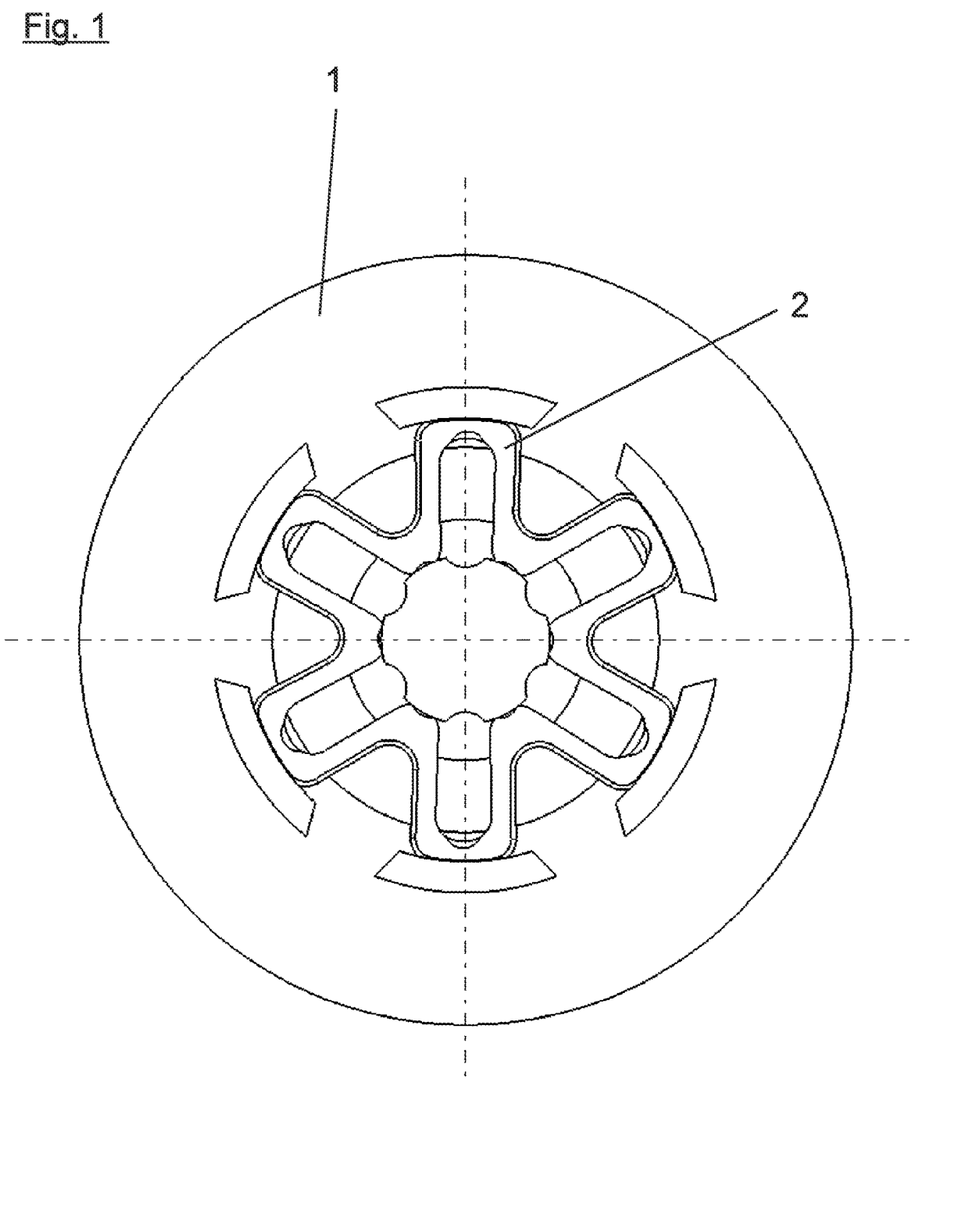
FIG. 1 is a front view of a rotor for an inventive sensor, where the rotor comprises a sheet metal element and a carrier and the sheet metal element is mounted to the rotor.
Figure 4:
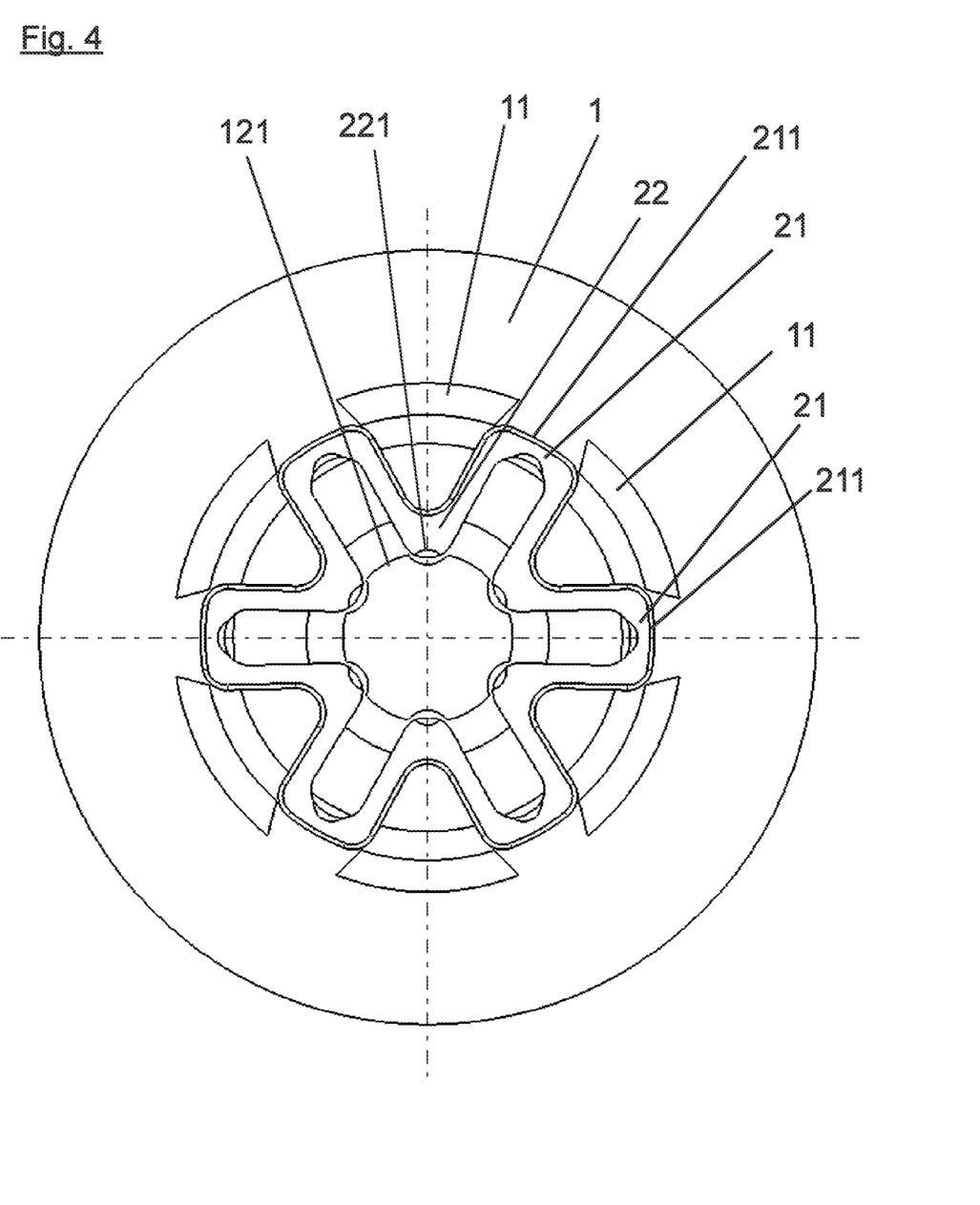
FIG. 4 is a front view corresponding to FIG. 1 but before connecting the sheet metal element and the carrier.
Figure 7:
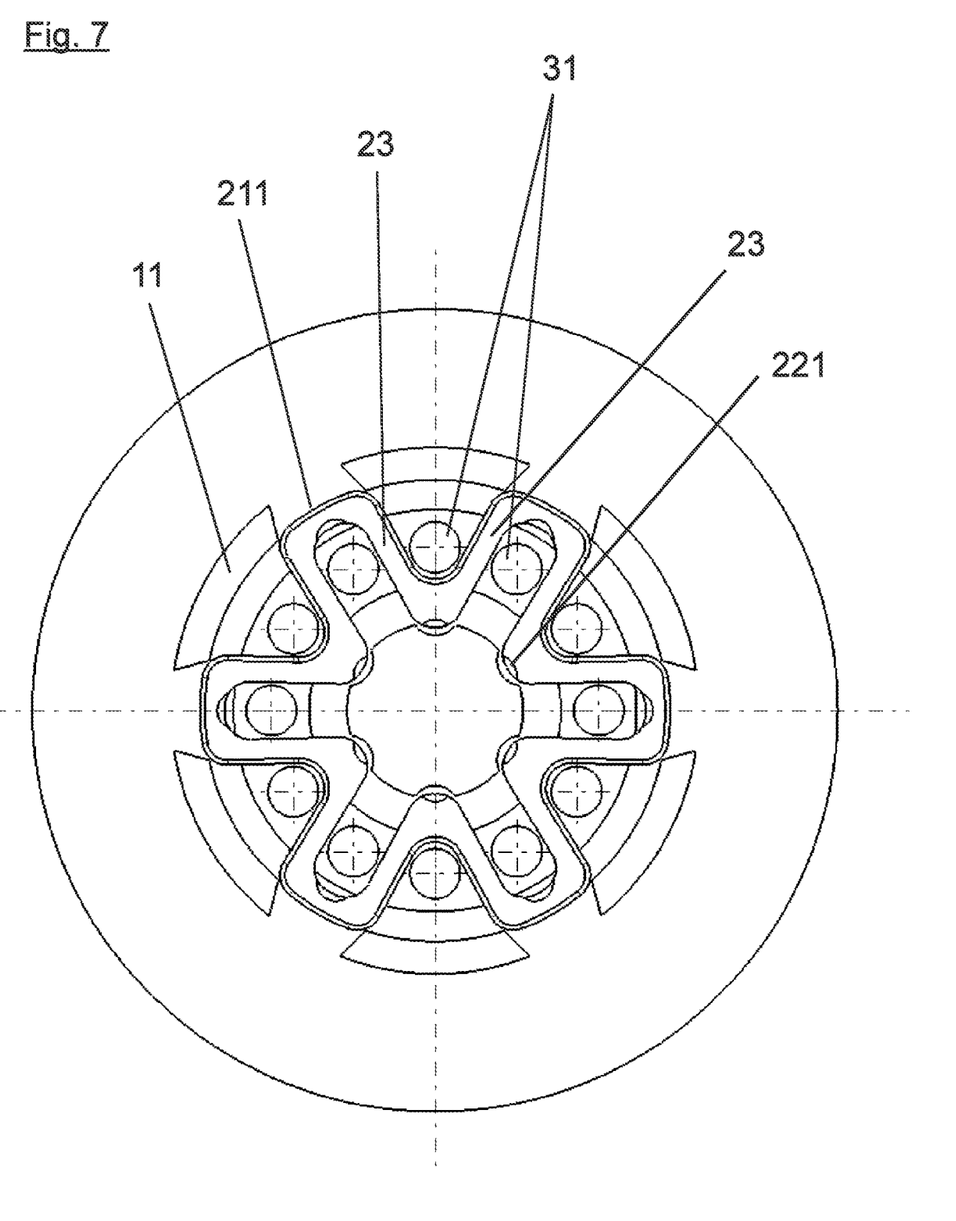
FIG. 7 is a cross-section through the arrangement of the carrier, the sheet metal element and the tool before fastening the sheet metal element to the carrier.

In a further assembly step, the tool 3 with the sheet metal element 2 inserted into it is placed on the carrier 1, specifically in such a way that the cutting structures 211 of the outer sections of the conductor loop lie between the outer retaining elements 11 and the cutting structures 221 of the inner sections 22 of the conductor loop lie between the prongs 121 of the inner retaining element 12. The tool 3 with the sheet metal element 1 inserted into it is then rotated and in doing to the cutting structures 211 of the outer sections 21 of the sheet metal element 2 cut into the outer retaining elements 11 of the carrier 1. At the same time, the cutting structures 221 of the inner sections 22 of the sheet metal element 2 also cut into the inner retaining element of the carrier 1. By cutting in, the sheet metal element 2 and the carrier 1 are connected to each other.

LIST OF REFERENCE NUMBERS

1 Carrier
11 Outer retaining element
111 Inner edge of the outer retaining elements
12 Inner retaining element
121 Prongs
13 Groove
2 Sheet metal element, conductor loop
21 Outer sections
211 Cutting structures of the outer sections
22 Inner sections
221 Cutting structures of the inner sections
23 Connecting sections
3 Tool
31 Carrier elements

We claim:

1. A sensor comprising:
a sheet metal element; and
a carrier,
wherein the sheet metal element is arranged on a first side of the carrier,
wherein the sheet metal element extends within a ring located between an inner circle and an outer circle,
wherein the sheet metal element includes cutting structures that are cut into at least one retaining element of the carrier for fastening the sheet metal element to the carrier, and
wherein the cutting structures include inner cutting structures arranged and extending circumferentially along the inner circle and/or outer cutting structures arranged and extending circumferentially along the outer circle.

2. The sensor in accordance with claim 1, wherein the cutting structures include the inner cutting structures and the outer cutting structures.

3. The sensor in accordance with claim 1, wherein the at least one retaining element of the carrier protrudes on the first side, and wherein the at least one retaining element includes an inner retaining element arranged essentially within the inner circle and extending outwards across the inner circle and/or outer retaining elements arranged essentially outside the outer circle and extending inwards across the outer circle.

4. The sensor in accordance with claim 3, wherein the inner cutting structures are cut into the inner retaining element and/or the outer cutting structures are cut into the outer retaining elements.

5. The sensor in accordance with claim 3, wherein structures of the inner retaining element are cut into the inner cutting structures, and/or wherein the structures of the inner retaining element are at a distance to each other that is the same size or larger than the area over which the inner cutting structures extend along the inner circle, and/or wherein the outer retaining elements along the outer circle are at a distance to each other that is the same size or larger than the area over which the outer cutting structures extend along the outer circle.

6. The sensor in accordance with claim 1, wherein the sensor is an inductive sensor for detecting movements, angles, or lengths.

7. The sensor in accordance with claim 1, wherein ends of the cutting structures cut into the retaining elements form cutting edges.

8. The sensor in accordance with claim 1, wherein the sheet metal element includes recesses.

9. A method for fastening the sheet metal element of the sensor in accordance with claim 1, the method comprising:
   arranging the sheet metal element and the carrier in a first position to each other in which the at least one retaining element is between the cutting structures;
   performing a movement in which the carrier and the sheet metal element are moved against each other, which causes the cutting structures to cut into the retaining elements or structures of the retaining elements in a direction of rotation.

10. A tool for fastening a sheet metal element of a sensor to a carrier of the sensor in accordance with the method of claim 9, wherein the sheet metal element of the sensor is arranged on a first side of the carrier,
   wherein the sheet metal element extends within a ring located between an inner circle and an outer circle,
   wherein the sheet metal element includes cutting structures that are cut into at least one retaining element of the carrier for fastening the sheet metal element to the carrier,
   wherein the cutting structures include inner cutting structures arranged and extending circumferentially along the inner circle and/or outer cutting structures arranged and extending circumferentially along the outer circle, and
   wherein the sheet metal element includes recesses, the tool comprising:
   a first surface over which carrier elements protrude that engage in the recesses of the sheet metal element when fastening the sheet metal element to the carrier.

11. The sensor in accordance with claim 1, wherein the inner circle and the outer circle extend about a central axis of the carrier.

12. The sensor in accordance with claim 1, wherein the at least one retaining element includes an inner retaining element protruding on the first side of the carrier, wherein the inner retaining element is arranged within the inner circle and has prongs that extend outward across the inner circle, and wherein the inner cutting structures are cut into the prongs along the inner circle.

13. The sensor in accordance with claim 1, wherein the at least one retaining element includes outer retaining elements arranged along the outer circle, wherein each outer retaining element includes an arcuate fin protruding on the first side of the carrier, and wherein the outer cutting structures are cut into the arcuate fins along the outer circle.

\* \* \* \* \*